Nov. 22, 1932.  P. CARLSON  1,888,787
ADJUSTABLE SEAT AND BACK
Filed Feb. 15, 1930
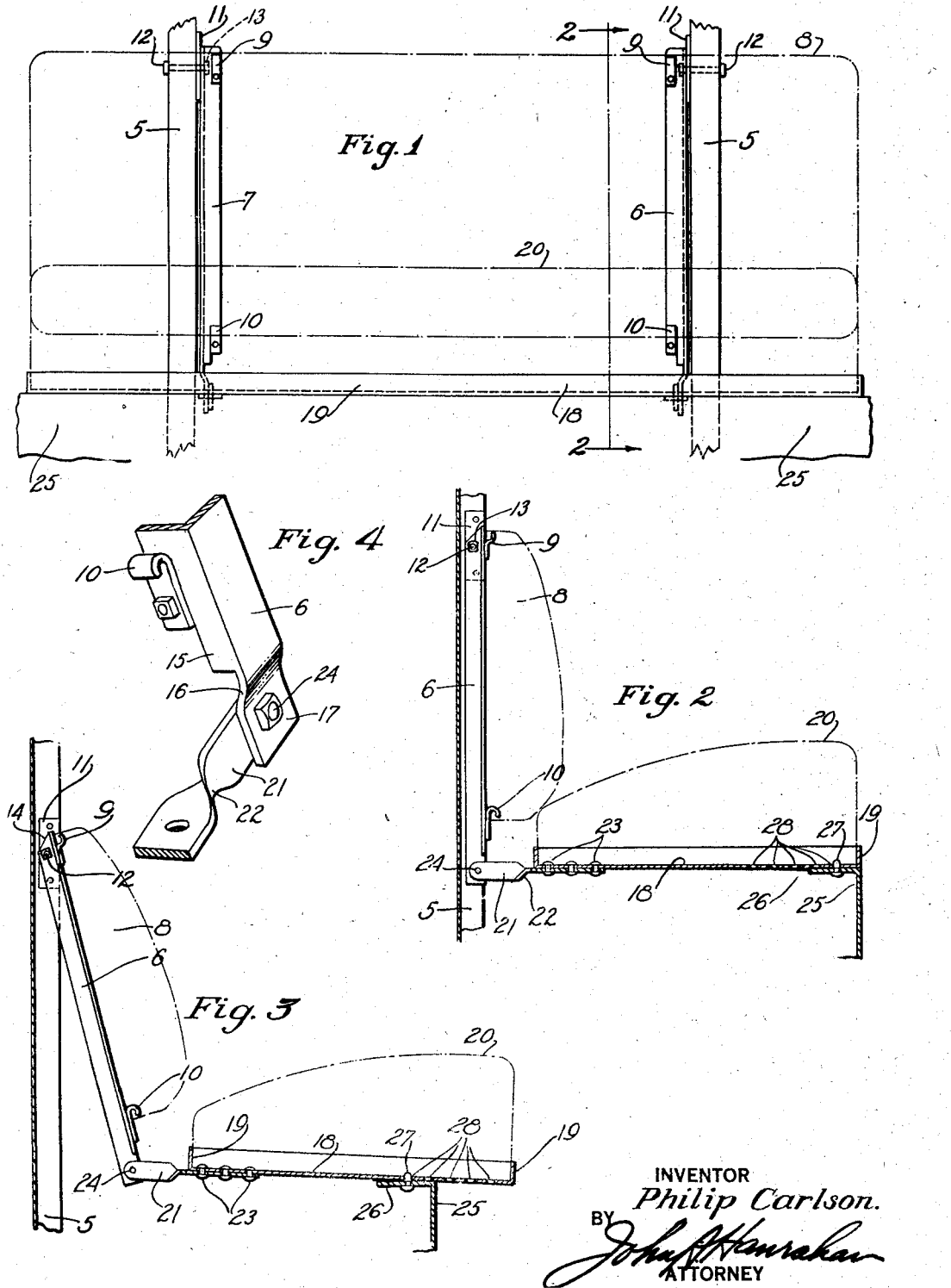
INVENTOR
Philip Carlson.
BY
John F. Hanrahan
ATTORNEY Patented Nov. 22, 1932

1,888,787

UNITED STATES PATENT OFFICE

PHILIP CARLSON, OF LONG HILL, CONNECTICUT, ASSIGNOR, BY MESNE ASSIGNMENTS, TO THE BRIDGEPORT-CITY TRUST COMPANY, OF BRIDGEPORT, CONNECTICUT, A CORPORATION OF CONNECTICUT

ADJUSTABLE SEAT AND BACK

Application filed February 15, 1930. Serial No. 428,730.

This invention relates to new and useful improvements in adjustable seats and has particular relation to an adjustable seat for truck cabs.

An object of the invention is to provide a readily adustable seat for a truck cab, the improved mechanism including means whereby the back rest associated with the seat is automatically adjusted as the seat is adjusted.

Another object of the invention is to provide an adjustable seat and back for a truck cab which seat and back comprise few parts, and may be cheaply made and easily and quickly installed.

According to the present invention the back support is pivotally mounted at its upper end and the seat is mounted to be adjusted forwardly and rearwardly, the lower end of the back support being pivotally connected with the seat whereby as the seat is moved the angle of the back relative to the seat will be varied while the seat remains in the same plane in its various adjusted positions.

Other objects and advantages will become apparent from a consideration of the following description taken in connection with the accompanying drawing.

In the accompanying drawing there is shown and in the following detailed description there will be described one satisfactory embodiment of the invention. However, it is to be understood that this disclosure is for the purpose of making clear the construction and operation of one form of the invention and that the invention is not limited to the details shown, since changes within the scope of the appended claims will readily suggest themselves to those skilled in the art. Therefore, reference must be had to the claims for a definition of the limitations of the invention.

In the drawing:

Figure 1 is a front elevational view of the improved adjustable seat and back, part of the truck cab structure for mounting the same being shown and the seat and back cushions being shown in dotted lines.

Fig. 2 is a sectional view on the line 2—2 of Fig. 1, the cushion being indicated in dotted lines;

Fig. 3 is a view somewhat similar to Fig. 2 but showing the seat and back in an adjusted position; and Fig. 4 is a detail.

Referring in detail to the drawing, at 5 is shown a pair of uprights usually employed in the construction of truck cabs forming part of the frame thereof. According to the present invention, these uprights or frame members 5 are utilized as a means to assist in mounting my improved adjustable seat and back.

As shown the invention includes back supporting members 6 and 7 each consisting of a section of angle iron to which the back cushion 8 is secured by means of upper and lower hook like members indicated at 9 and 10 respectively. The uprights 5 are each equipped with a bearing plate 11 and the back supporting members 6 and 7 are pivotally secured to the uprights 5 through the medium of bolts 12 passing through the uprights and bearing plates 11 and through one side of each of the members 6 and 7. The bolts 12 are secured as by nuts 13 and the upper ends of the angle iron or back supporting members 6 and 7 are cut away on an arc as at 14 whereby as the seat and back are adjusted by swinging the members 6 and 7 on the bolts 12 the ends of the members 6 and 7 will not project beyond the rear surfaces of the uprights 5.

The lower end of each of the back supporting angle iron members 6 and 7 has one side cut away as at 15 and the opposite side is laterally offset as at 16. In this way extensions 17 are provided and these extensions 17 of the angle iron members 6 and 7 are perforated for a purpose to be described. The adjustable seat proper includes a shallow tray 18 having its edges up-turned as at 19 to embrace the lower edge portions of the seat or cushion 20 when the latter is within the tray.

For the purpose of securing the tray 18 of the seat to the back supporting members 6 and 7 steel straps 21 are used. Intermediate their ends the straps 21 are given a half turn or twist as shown at 22 and have their forward portions riveted, bolted or otherwise secured to the tray 18 as shown at 23. The rear portions of the straps 21 are perforated and the straps are hingedly or pivotally secured to the perforated end of extensions 17 of the angle iron members 6 and 7 as by bolts 24.

As clearly shown the tray 18 rests upon a seat box 25 but fragmentarily shown in the drawing. This seat box at its upper edge includes an inturned flange 26 on which the tray 18 rests. Flange 26 at the forward side of the seat box 25 carries a pair of spaced projections 27 which may be in the form of rivets as shown or in the form of bolts, it being understood that these projections or stops 27 are rigid with the flange 26. Projections 27 secure the seat and back in the desired position. In Fig. 2 the seat and back are shown in full lines in the straight or nonadjusted position. Tray 18 is provided with two rows of perforations 28 for co-operation with the projections 27.

In the operation of the device to effect the desired adjustment it is but necessary that the seat be raised to disengage the projection or studs 27 from the pair of openings 28 with which they happened to be in engagement and to thereafter pull the seat forwardly or push it rearwardly to align and engage the studs 27 with the pair of openings 28 which will give the desired adjustment. Also ready access may be had to the seat box 25, in which tools or the like may be carried. Owing to the offset at 16 and the cut away at 15 on the lower end of the back supporting members 6 and 7, the rear ends of the steel straps 21 will not engage the members 6 and 7 when the seat is swung upwardly on the pivot bolts 24.

From the foregoing description, it will be apparent that I have provided an easily and quickly adjustable seat structure and one wherein the back is adjustable with the seat. Also, it will be apparent that the adjustable seat and back of the present invention is inexpensive since it is so made as to be mounted on the uprights 5 usually employed in cab construction and provides a convenient means for mounting the back cushion 8 and the seat cushion 20, for which purpose some means must be provided. Additionally, it is to be noted that the invention utilizes the cushion carrying tray and the seat box as means for holding the seat and back in adjusted position.

Having thus described my invention, what I claim is:

1. In combination with a truck cab body including a pair of spaced uprights, a pair of vertically arranged back supporting members, means pivotally connecting the back supporting members to the opposed faces of said spaced uprights, said back supporting members each including a length of angle iron having one of its sides against the upright to which it is pivoted whereby its other side projects laterally of the upright, a back secured to said other sides of the back supporting members and extending downwardly from a point adjacent their upper ends, a seat member, straps pivoted at their rear ends to the lower ends of the back supporting members, said straps rigidly connected with the seat member whereby as the seat member is moved forwardly and rearwardly for adjustment the angle of the back will also be adjusted, means to secure the seat member and thereby the back in adjusted positions, and said pivotal connecting means for the back supporting members located at the upper ends of said members whereby the upper portion of the back will not be swung rearwardly as the seat is adjusted forwardly.

2. In combination with a truck cab body including a pair of spaced frame bars, a pair of vertically arranged back supporting members, means pivotally securing said members to said bars, said members each including a length of angle iron having one of its sides facing forwardly of the body, a back extending from a point adjacent the upper ends of said members and supported on said sides, a seat member, a seat box on which said seat member rests, a pair of straps pivotally connected at their rear ends with the lower ends of the back supporting members by bolts, said straps at their forward ends rigidly connected with the seat member whereby as the seat member is moved for adjustment the back will also be adjusted, means to secure the seat member and thereby the back in adjusted positions, said back supporting members having their back supporting sides cut away adjacent their lower ends to permit vertical movement of the straps and thereby the seat member on the pivots between the back and straps to permit access to be had to the interior of the seat box, and said pivotal connecting means between the back supporting members and the frame bars being located at the upper ends of said members whereby the upper portion of the back is not swung rearwardly as the seat and back are adjusted forwardly.

Signed at Bridgeport, in the county of Fairfield, and State of Connecticut.

PHILIP CARLSON.